United States Patent [19]

Dobry

[11] 4,354,943

[45] Oct. 19, 1982

[54] CLARIFICATION OF AMMONIUM POLYPHOSPHATE SOLUTIONS

[75] Inventor: Alan M. Dobry, Chicago, Ill.

[73] Assignee: Standard Oil Company (Indiana), Chicago, Ill.

[21] Appl. No.: 950,974

[22] Filed: Oct. 13, 1978

Related U.S. Application Data

[63] Continuation-in-part of Ser. No. 781,625, Mar. 28, 1977, abandoned.

[51] Int. Cl.$^3$ ............................................. B01D 21/01
[52] U.S. Cl. ........................................ 210/727; 71/36; 210/734; 210/735; 423/305
[58] Field of Search ................. 71/34, 36, 41; 210/42 R, 44, 45, 49, 51–54, 56, 702, 725, 727, 728, 734, 735, 737; 423/302, 305, 306, 310, 312, 321 R, 321 S

[56] References Cited

U.S. PATENT DOCUMENTS

| | | | |
|---|---|---|---|
| 2,936,888 | 5/1960 | Williams | 210/54 |
| 2,968,528 | 1/1961 | Tuttle et al. | 210/54 |
| 3,129,170 | 4/1964 | Ittinger | 210/54 |
| 3,288,707 | 11/1966 | Hurwitz et al. | 210/54 |
| 3,377,274 | 4/1968 | Burke et al. | 210/53 |
| 3,617,568 | 11/1971 | Ries, Jr. | 210/53 |
| 3,630,711 | 12/1971 | Burkert et al. | 71/34 |
| 3,644,091 | 2/1972 | Naschke et al. | 210/54 |
| 3,969,483 | 7/1976 | Stinson et al. | 423/305 |

*Primary Examiner*—Peter A. Hruskoci
*Attorney, Agent, or Firm*—Richard A. Kretchmer; William T. McClain; William H. Magidson

[57] ABSTRACT

Suspended black carbonaceous material contained in aqueous ammonium polyphosphate solutions, which are derived from impure wet-process phosphoric acid, is removed by mixing such a solution with ionic, water soluble, high polymers having a molecular weight in excess of one million, holding the mixture until the suspended material flocculates and floats to the surface, and separating the flocculated carbonaceous material from the resulting clarified ammonium polyphosphate solution.

2 Claims, No Drawings

CLARIFICATION OF AMMONIUM POLYPHOSPHATE SOLUTIONS

CROSS-REFERENCE TO RELATED APPLICATIONS

This application is a continuation-in-part of application Ser. No. 781,625, filed Mar. 28, 1977 now abandoned.

BACKGROUND OF THE INVENTION

This invention relates to the removal of particulate matter from ammonium polyphosphate solutions which are prepared from impure wet-process phosphoric acid. More particularly, it relates to a new and improved process for the flocculation, flotation, and removal of suspended, black, carbonaceous impurities from aqueous solutions of ammonium polyphosphate which are produced from wet-process phosphoric acid.

Wet-process phosphoric acid is produced by the reaction of phosphate rock, particularly calcium phosphate, with sulfuric acid and separating the resulting crude phosphoric acid from the precipitated calcium sulfate and other insoluble materials. This crude acid ordinarily contains about 30 to 32% $P_2O_5$ when produced (filter-grade acid) and is normally concentrated to a $P_2O_5$ concentration of about 52 to 54% (merchant-grade acid) before shipment. Concentration of the wet-process acid prior to shipment not only serves to increase the $P_2O_5$ content, but also has the effect of increasing the concentration of impurities that are present.

Crude wet-process phosphoric acid contains varying amounts of impurities such as iron, aluminum, calcium, magnesium, and other metals in the form of their phosphates, sulfates, or fluorides, depending on the characteristics of the specific phosphate rock which is used as the starting material. In addition to these inorganic impurities, organic materials are also commonly present as contaminants and are derived from organic substances originally present in the phosphate rock and from organic chemicals utilized in benefication of the rock prior to treatment with sulfuric acid. A portion of these impurities are in solid form and result from imperfect filtration, from precipitation during concentration, or from post-precipitation. Other impurities are soluble and remain in solution.

Phosphate rock which is utilized for the preparation of a wet-process phosphoric acid is often heavily contaminated with both soluble and insoluble organic material. Although organic material can be removed by calcination of the phosphate rock prior to use, such processing is becoming increasingly unfeasible as a result of the large energy requirement involved. This is illustrated by the fact that such calcination requires an expenditure of about 3 million Btu per ton of rock. Consequently, furnace-grade phosphoric acid, which is prepared from calcined phosphate rock, is becoming increasingly expensive and impractical for use in applications such as the preparation of fertilizers.

In the preparation of liquid fertilizers, it has been found desirable to concentrate merchant-grade phosphoric acid to higher $P_2O_5$ values. By subjecting the merchant-grade acid to evaporating means, either at atmospheric or reduced pressure, the $P_2O_5$ content can be increased from about 52 to 54% to a value in the range from about 60 to 76%. This concentration results in a molecular dehydration of the phosphoric acid and conversion from the orthophosphate form to the polyphosphate form. Occurring concurrently with the molecular dehydration of the merchant-grade acid is the charring of dissolved organic impurities at the elevated temperatures required. The resulting product is a black phosphoric acid solution which contains a substantial amount of polyphosphate and also a plethora of suspended, black carbonaceous particles which originate from the organic impurities in the merchant-grade starting material. Although it would be highly advantageous to clarify this black phosphoric acid before its combination with other components, as in the manufacture of fertilizer solutions, no practicable process for doing this has yet been devised.

Wet-process phosphoric acid is widely used in the manufacture of ammonium polyphosphate fertilizer solutions. Two basic methods are utilized for this purpose. One method, as set forth in U.S. Pat. No. 3,044,851, involves the dehydration of merchant-grade wet-process phosphoric acid followed by reaction with ammonia in a subsequent step. Alternatively, as set forth in U.S. Pat. No. 3,382,059, filter-grade or merchant-grade wet-process phosphoric acid can be reacted with anhydrous ammonia, and the autogenous heat of reaction utilized to dehydrate and convert the orthophosphate starting material to ammonium polyphosphate in a single step. Unfortunately, both of these methods produce ammonium polyphosphate solutions which are highly discolored due to the presence of black carbonaceous particular matter. This particulate carbonaceous material is derived from organic impurities in the wet-process phosphoric acid which char and are rendered insoluble during the dehydration which converts the orthophosphate starting material to a polyphosphate product. Although furnace-grade phosphoric acid can be utilized, in place of the wet-process material, to produce clear ammonium polyphosphate solutions which are free of black, particulate carbonaceous material, a substantial economic penalty accompanies the use of furnace-grade acid.

Liquid fertilizers having compositions similar to those of standard dry mixed fertilizers are well known in the industry and are increasing in popularity. Such solutions are superior to dry mixed fertilizers in that the cost of evaporating water and bagging the product are eliminated and soil application is greatly simplified. In addition, the use of liquid fertilizers eliminates difficulties due to segregation and caking which are often encountered in the storage of dry fertilizers. Although ammonium polyphosphate solutions prepared from wet-process phosphoric acid, as detailed supra, are currently the preferred source of liquid fertilizers containing nitrogen and phosphorus, they suffer from the serious deficiency of an inky black color which is due to suspended, black carbonaceous particulate matter. Filtration of the black ammonium polyphosphate solution is not practicable since the carbonaceous particles coalesce on the filter to generate a sticky impermeable layer which prevents further filtration. In addition, this suspended carbonaceous material will not spontaneously settle under conditions which would permit its removal on a large scale.

Black ammonium polyphosphate fertilizer solutions, which are prepared from wet-process phosphoric acid, are objectionable since the dark coloration masks the presence of precipitated solids which can result in plugged equipment and difficulties in the application of such material to the soil. In addition, this type of black fertilizer solution is less aesthetically pleasing than a clear ammonium polyphosphate solution which does not contain suspended black carbonaceous material, but which is otherwise the same. In view of these factors, consumers are becoming increasingly resistant to the use of black ammonium polyphosphate fertilizer solutions or other black fertilizer solutions derived from them. At the present time, the consumer will not use these black liquids except in the case of extreme emergency. Consequently, a large price differential exists between the black ammonium polyphosphate solutions and clear green solutions of the same analysis.

It has previously been demonstrated that suspended, black carbonaceous material can be removed from aqueous ammonium polyphosphate solutions by a flocculation and flotation process. U.S. Pat. No. 3,630,711, is directed to a method for clarifying black 10-34-0 grade ammonium polyphosphate solutions. This method involves the addition of from about 0.1 to about 0.6% by weight of a water insoluble aliphatic amine to the black solution followed by vigorous agitation of the mixture after which the carbonaceous material is permitted to flocculate and float to surface as a froth. The resulting froth is then conveniently removed.

An improved flocculation and flotation process for the clarification of black, aqueous ammonium polyphosphate solutions is set forth in U.S. Pat. No. 3,969,483. This improved process involves the combination of two flocculating agents, one of which is either an aliphatic amine or an aliphatic amine acetate and the other is a quaternary ammonium chloride. These two flocculating agents act together in a synergistic manner and produce flocculation at addition rates which are significantly lower than those required by the process disclosed in U.S. Pat. No. 3,630,711. Even with this improved process, however, it is still necessary to use a total of about 0.1% of these two flocculating agents in order to produce a clear ammonium polyphosphate solution having a light absorbance below 0.3 (relative to distilled water at 560 nm). This process also requires vigorous agitation of the mixture of black ammonium polyphosphate solution and flocculating agents. In addition, this process is carried out at elevated temperatures in the range from about 165° to about 190° F. which results in the substantial and undesirable loss of polyphosphate content in the solution.

It is an objective of this invention to prepare from wet-process phosphoric acid, a clear aqueous solution of ammonium polyphosphate which is essentially free of suspended, black carbonaceous material.

Another objective of this invention is to provide a process for the clarification of black ammonium polyphosphate solutions which are derived from wet-process phosphoric acid, which process which can be carried out at lower temperatures than has been heretofore possible.

A further objective of this invention is to provide a process for the clarification of black ammonium polyphosphate solutions which are derived from wet-process phosphoric acid, which process does not require vigorous agitation of a flocculating agent with the black solution.

A still further objective of this invention is to provide a new and more effective agent for the clarification of black ammonium polyphosphate solutions which are prepared from wet-process phosphoric acid.

SUMMARY OF THE INVENTION

The present invention is directed to a process for the flocculation and removal of suspended, finely divided, insoluble, carbonaceous material from aqueous ammonium polyphosphate solutions, derived from wet-process phosphoric acid, which comprises the steps of:
(a) mixing said ammonium polyphosphate solution with an aqueous solution of at least one ionized, water soluble, organic high polymer having a molecular weight in excess of one million, wherein said organic polymer or polymers are either cationic or anionic materials, wherein the amount of said polymer is from about 0.001 to about 0.5% by weight based on the weight of said ammonium polyphosphate solution, and wherein said aqueous organic polymer solution contains from about 0.1 to about 5% by weight of said organic polymer;
(b) holding the resulting mixture for a period of time effective to permit the separation of said mixture into an upper layer of flocculated carbonaceous material and a lower layer of clarified ammonium polyphosphate solution; and
(c) separating said lower layer of clarified ammonium polyphosphate solution from said upper layer of flocculated carbonaceous material.

Step (a) of the above described process can also be advantageously carried out by using a combination of cationic and anionic organic high polymers according to either of the following modifications:

1. Sequentially adding to the unclarified ammonium polyphosphate solution from about 0.001 to about 0.5% of at least one cationic organic polymer followed by from about 0.001 to about 0.1% of at least one anionic organic polymer; wherein said percentages are by weight and are based on the weight of said ammonium polyphosphate solution; wherein said organic polymers are water soluble and have a molecular weight in excess of one million; and wherein the organic polymers are added in the form of aqueous solutions which contain from about 0.1 to about 5% by weight of polymer.

2. Sequentially adding to the unclarified ammonium polyphosphate solution from about 0.001 to about 0.5% of at least one anionic organic polymer followed by from about 0.001 to about 0.1% of at least one cationic organic polymer; wherein said percentages are by weight and are based on the weight of said ammonium polyphosphate solution; wherein said organic polymers are water soluble and have a molecular weight in excess of one million; and wherein the organic polymers are added in the form of aqueous solutions which contain from about 0.1 to about 5% by weight of polymer.

DETAILED DESCRIPTION OF THE INVENTION

This invention is an improved process for the separation of suspended, insoluble, black, carbonaceous material from ammonium polyphosphate solutions which are produced from wet-process phosphoric acid. The wet-process phosphoric acid used to prepare these ammonium polyphosphate solutions may contain from about 30 to about 76% $P_2O_5$. The ammonium polyphosphate solutions are then produced by the molecular dehydration and subsequent or concurrent ammoniation of this wet-process phosphoric acid. These ammonium polyphosphate solutions have a pH above about 4.5 and, preferably, above about 5.0. In addition, the ammonium polyphosphate solutions contain from about 10 to about 90% by weight and, preferably, from about 50 to about 90% by weight of the total $P_2O_5$ in a polyphosphate form. Preferred solutions contain a nitrogen content of about 8 to about 13% and a $P_2O_5$ content of about 27 to about 37%. Consequently, the preferred ammonium polyphosphate solutions range in grade from about 8-27-0 to about 13-37-0. Most preferably, the ammonium polyphosphate solution is of about a 10-34-0 grade.

The separation of suspended, insoluble, carbonaceous material from the ammonium polyphosphate solutions is accomplished by mixing such a solution with a small amount of an organic, polymeric, ionic flocculant, allowing the carbonaceous material to coagulate and float to the surface, and then drawing off the bottom layer of clarified ammonium polyphosphate solution. Only certain specific flocculants are suitable, however, and these are all ionic, water soluble, organic high polymers having molecular weights in excess of one million. Either anionic or cationic organic polymers can be used, but the cationic polymers are preferred. Nonionic organic polymers are unsatisfactory and cannot be used as flocculants in the process of this invention.

The ionic organic polymers of this invention, preferably, possess a high charge density. At concentrations of 1 to 2% in water, these ionic organic polymers produce solutions having viscosities greater than about 400 centipoise at ambient temperatures. The polymers must be dissolved in water prior to use, and preferably, the aqueous solution is allowed to stand for a period of at least about one hour prior to use. During this standing period, it is believed that the polymer molecules are converted from a coiled to an extended configuration in which form they are most effective in flocculating the suspended carbonaceous material.

As a result of the high viscosity of aqueous solutions of the ionic organic high polymers of this invention, it is virtually impossible to handle solutions having a concentration greater than about 5%, and difficult to handle solutions having a concentration greater than about 2% by weight. Since, however, water in the polymer solution serves to dilute the final clarified ammonium polyphosphate solution, it is desirable to use the polymer in the form of an aqueous solution which is as concentrated as possible. Consequently, it is highly preferred to use an aqueous solution containing from about 1 to about 2% by weight of the ionic organic polymer. Nevertheless, the process of this invention may be carried out using an aqueous solution which contains from about 0.1 to about 5% by weight of ionic organic polymer.

Satisfactory organic, polymer ionic flocculants for use in the process of this invention includes the following specific materials:

Primafloc C-3, a cationic flocculant, a condensation product of epichlorohydrin and a polyamine of molecular weight greater than one million, sold by Rohm and Haas Company.

Primafloc C-7, a cationic flocculant, a polyvinyl imidazoline bisulfate of molecular weight greater than one million, sold by Rohm and Haas Company in the form of a fine powder.

Hercofloc 848, a cationic flocculant, consisting of 38-42% of an acrylamide based polymer of molecular weight in excess of one million mixed with unreacted monomer and various solvents, sold by Hercules Incorporated in the form of a liquid of viscosity 120,000-170,000 centipoise at 25° C.

Hercofloc 871, a cationic flocculant, consisting of Hercofloc 848 diluted to $11\frac{1}{2}-13\frac{1}{2}\%$ polymer with water, a liquid with a viscosity of 3300 centipoise at 24° C.

Calgon WT-2820, a cationic flocculant, a homopolymer sold by Calgon Corp. as a viscous liquid, 6% in water.

Primafloc A-10, an anionic flocculant, a copolymer of methacrylic acid and an acrylic ester, sold in the form of a 20% aqueous emulsion by Rohm and Haas Company. This material must be neutralized with base before use.

Purifloc A-23, an anionic flocculant, a partially hydrolyzed polyacrylamide of high molecular weight, sold by Dow Chemical Company in the form of a fine powder. A specially pure grade of this material, Purifloc A-23P, is sold for use in treating potable water.

Betz 1130 polymer, an anionic flocculant, a very strongly anionic, high molecular weight acrylamide copolymer, sold by Betz Laboratories in the form of a fine powder. It is also sold under the designations Betz 1230, 1330, 1430, 2830 and 3330.

The process of this invention may be carried out at temperatures in the range of about 35° to about 200° F., preferably in the range from about 60° to about 170° F., and more preferably in the range from about 100° to about 160° F. Although the flocculation and flotation of carbonaceous material is most rapid at a temperature of about 160° F., it also takes place at a highly satisfactory rate at temperatures of about 68° F. The more rapid rate of separation at elevated temperatures is believed to be due, at least in part, to a reduced viscosity. Operation at temperatures above about 160° F. is undesirable since high temperatures effect a relatively rapid reduction of the polyphosphate content of the ammonium polyphosphate solution.

The organic, ionic, polymeric flocculant may be mixed with the black, unclarified ammonium polyphosphate solution at a temperature which is higher than that at which flocculation and flotation is permitted to take place. In an especially preferred embodiment, the mixing step is carried out at a temperature from about 100° to about 200° F. and flocculation is allowed to take place at a lower temperature in the range of from about 35° to about 120° F.

Since the organic, ionic, polymeric flocculants are water soluble and are used in aqueous solution, they are easily mixed with the ammonium polyphosphate solutions of this invention, and very litte agitation is necessary. The process does not require mixing in excess of that which is produced by turbulent flow through pipes.

The cationic or anionic, polymeric organic flocculants of this invention are used in very small quantities which may range from about 0.001 to about 0.5% by weight based on the weight of the black ammonium polyphosphate solution which is undergoing treatment. Preferably, the amount of organic, ionic, polymeric flocculant is from about 0.005 to about 0.08%, and more preferably, from about 0.01 to about 0.04% by weight based on the weight of ammonium polyphosphate solution.

In a highly preferred embodiment, the black ammonium polyphosphate solution is first mixed with a cationic, polymeric, organic flocculant and then, subsequently, mixed with an anionic, polymeric, organic flocculant. The amount of cationic polymer is from about 0.001 to about 0.5% and preferably from about 0.01 to about 0.04%, and the amount of anionic polymer is from about 0.001 to about 0.1% and preferably from about 0.005 to about 0.02%, wherein said percentages are by weight and are based on the weight of the black ammonium polyphosphate solution. The ratio of cationic to anionic flocculant may range from about 100:1 to about 1:10, more preferably from about 10:1 to about 1:5, and most preferably from about 4:1 to about 1:1. This sequential addition of cationic flocculant followed by anionic flocculant affords highly satisfactory flocculation at polymer addition levels which are substantially lower than those which are necessary when only a cationic flocculant or only an anionic flocculant is used. This synergistic effect is not observed, however, when the cationic and anionic flocculants are added simultaneously.

In another embodiment, the black ammonium polyphosphate solution is first mixed with an anionic, polymeric, organic flocculant and then, subsequently, mixed with a cationic, polymeric, organic flocculant. The amount of anionic polymer is from about 0.001 to about 0.5% and preferably from about 0.01 to about 0.04%, and the amount of cationic polymer is from about 0.001 to about 0.1% and preferably from about 0.005 to about 0.02%, wherein said percentages are by weight and are based on the weight of the black ammonium polyphosphate solution.

The black ammonium polyphosphate solution, after mixing with the ionic, polymeric organic flocculating agent or agents, is allowed to stand for a period of time effective to permit the separation of the mixtures into an upper layer of flocculated carbonaceous material and a lower layer of clarified ammonium polyphosphate solution. The period of time required for satisfactory separation may range from a few minutes to several days. Preferably, however, the holding period is at least about one hour. After separation has taken place, the lower layer of clarified solution is removed.

The entire process, or parts of it, may be carried out either continuously or in a batch-type operation. The process may be carried out continuously by pumping a mixture of black ammonium polyphosphate solution and ionic, polymeric, organic flocculating agent or agents into a vertical holding vessel from which clarified ammonium polyphosphate solution is continuously removed from the bottom while flocculated carbonaceous material is removed from the top. This holding vessel must be large enough to ensure a residence time which is effective to permit the separation of clarified liquid and flocculated carbonaceous material. Removal of flocculated carbonaceous material from the top of the holding vessel may be accomplished by pumping means or, more simply, by allowing it to overflow into another storage vessel. Since, however, this flocculated material will be considerably thickened, mechanical means such as a moving arm or buckets may be necessary to assist in its removal. To accelerate and further improve the flocculation and separation, air flotation may be utilized, which involves the introduction of air into the mixture contained in the holding vessel.

The process may also be carried out in a batch-type operation. In such an operation, the mixture of black ammonium polyphosphate solution and ionic, polymeric, organic flocculating agent or agents is collected in a large holding vessel and allowed to stand until flocculation and separation of the carbonaceous material is complete. The lower layer of clarified ammonium polyphosphate solution is removed through a bottom connection, and the upper layer of flocculated carbonaceous material is then removed through the same connection. If the upper layer is too viscous for easy flow, it may be mixed with some of the lower layer, which has been left behind for this purpose, thus reducing its viscosity to a manageable value. The viscosity of the upper layer of flocculated material may also be reduced by mixing it with unclarified black ammonium polyphosphate solution. Alternatively, the upper layer of flocculated material may be pumped off through a floating intake located a short distance below the top of the mixture.

The clarified ammonium polyphosphate solutions produced by the process of this invention are suitable either for direct use as liquid fertilizers or for further processing into related fertilizers. The clarified 10-34-0 grade ammonium polyphosphate solution prepared according to this process is particularly suitable for use as a liquid fertilizer.

When a 10-34-0 grade black ammonium polyphosphate solution is clarified according to the process of this invention, the upper layer of flocculated carbonaceous material, containing up to about 5% of coagulated material and flocculants, also analyzes as 10-34-0 fertilizer. This upper layer can be used in preparing suspension fertilizers, such as 3-10-27 grade material, either without dilution or after dilution with clarified or unclarified 10-34-0 grade solution for ease of handling. In addition, since the upper layer may contain up to about 5% of coagulated polyelectrolyte particulates plus polyelectrolyte flocculants and in view of the fact that these materials are soil conditioners and improvers for sandy and clay soils, this upper layer material is valuable as a combined fertilizer and soil conditioner for such soils.

The following examples are intended only to illustrate the invention and are not to be construed as imposing limitations on the invention.

EXAMPLE I

The results set forth in Tables 1–9 were obtained by mixing preheated 200 g. portions of a black 10-34-0 grade ammonium polyphosphate solution with aqueous solutions of various flocculants in a one pint Waring Blender for 30 seconds. Each resulting mixture was then poured into a 125 ml. graduated, cylindrical separatory funnel and held at a controlled temperature. The efficiency of the various flocculants in causing the suspended, black carbonaceous material to coagulate and separate as an upper layer was determined by measuring the percentage of clarified liquid present as a lower layer in the separatory funnels after 5, 10, 30 and 60 minutes. The presence of either large particles of flocculated material or of small specks suspended in the otherwise clear lower layer was also noted. At the end of 60 minutes, a sample of the clarified lower layer was drained into a spectrophotometer cell and its absorbance measured at 560 nm using a Beckman DB-GT double beam grating instrument with distilled water as the reference.

In those runs wherein a sequential addition of two different flocculants was employed, the first flocculant was added according to the above described general procedure. After a selected period of time, the second flocculant was added in the form of an aqueous solution and mixed for 30 seconds in the Waring Blender. This final mixture was then poured into a graduated, cylindrical separatory funnel and observations made as described above.

The results set forth in Table 1 serve to demonstrate that the cationic flocculants are more effective at low concentrations than are the anionic flocculants.

The results set forth in Table 2 indicate that the simultaneous addition of equal amounts by weight of both cationic and anionic polymeric organic flocculants is substantially ineffective in clarifying black ammonium polyphosphate solutions.

The results of Tables 1 and 3 demonstrate that substantially improved results are obtained by the sequential addition of cationic and anionic flocculants as opposed to the use of an equivalent amount of only a single cationic or anionic flocculant.

The series of tests set forth in Table 4 demonstrates that very effective flocculation can be produced through the use of Primafloc C-7 followed by either Primafloc A-10 or Purifloc A-23. There is very little change on extending the time between additions from 2 to 10 minutes, although the results of Table 2 indicate that some time interval between additions is essential. Table 4 also shows that the rate of flocculants is important. A ratio of cationic flocculant to anionic flocculant of 1:2 is clearly inferior to a ratio of 2:1.

Table 5 serves to supplement Table 4 and demonstrates that improved results are obtained with larger amounts of flocculants.

The results set forth in Table 6 indicate that flocculation and separation of the carbonaceous material as an upper layer is improved by raising the temperature to 160° F., but a further increase to 190° F. serves to inhibit the separation. Table 6 shows that excellent separations can be obtained at 160° F. while using much less flocculant than is needed at 68° F.

The results set forth in Tables 7 and 8 show that the temperature of initial mixing is more important than the temperature at which the mixture is held for flocculation and separation. With a mixing temperature of 160° to 190° F., fair separations can be obtained with 0.01% of Primafloc C-7 alone, and good separations can be obtained with 0.02% if the mixtures are held at 68° F. subsequent to mixing.

Runs 1 and 8–10 in Table 9 serve to illustrate the use of additional ionic, polymeric organic flocculants which may be used in the process of this invention. The negative results of Runs 2–7 are representative of the results which are obtained with most conventional flocculants.

EXAMPLE II

The results set forth in Table 10 were obtained by continuously adding a 2% aqueous solution of Primafloc C-7 to a fresh 140° F. stream of black 10-34-0 ammonium polyphosphate solution from a pipe reactor. The mixture went through a cooler and then through a holding tank. After a total holding time of about 12 minutes, the stream, now cooled to 105° F., was mixed with 1% aqueous Primafloc A-10 and run into a storage tank having a height and diameter of 12 feet. This process was continued until the storage tank was filled, usually in about seven hours. Samples were taken before and after the A-10 addition point, poured into separatory funnels and examined as before. The separation in the tank was also measured at intervals of up to two weeks. The production rate of 10-34-0 solution varied from 19 to 30 gallons per minute during these runs.

The clear green lower phase obtained in Run 2A was analyzed and found to be of high quality and possessed a polyphosphate content equal to that of the black 10-34-0 starting material. The black upper layer of coagulated carbonaceous material from Run 2A was mixed with enough of the clarified lower layer to reduce its viscosity and was then formulated into a 3-10-27 grade fertilizer, which was as good as 3-10-27 fertilizer made from untreated black 10-34-0 ammonium polyphosphate solution.

TABLE 1.

| | | Addition of 2% Aqueous Solutions of Single Flocculants, Starting at 68° F. and Holding at 68° F. | | | | | |
|---|---|---|---|---|---|---|---|
| | | Weight of Flocculant Solution Added (g.) | % Lower Layer Separated After | | | | Absorbance at 560 nm |
| Run | Flocculant | | 5 Minutes | 10 Minutes | 30 Minutes | 60 Minutes | |
| 1 | Primafloc C-3 | 1.00 | 0 | 0 | 0 | 29, semi-clear | 1.92 |
| 2 | Primafloc C-3 | 0.100 | 0 | 0 | 0 | 0 | |
| 3 | Primafloc C-7 | 1.00 | 0 | 0 | 0 | 25, semi-clear | 1.82 |
| 4 | Primafloc C-7 | 0.100 | 0 | 0 | 0 | 0 | |
| 5 | Purifloc A-23 | 1.00 | 0 | 0 | 0 | 0 | |
| 6 | Purifloc A-23 | 0.100 | 0 | 0 | 0 | 0 | |
| 7 | Primafloc A-10 | 1.00 | 0 | 0 | 0 | 0 | |
| 8 | Primafloc A-10 | 0.100 | 0 | 0 | 0 | 0 | |

TABLE 2.

| | | Simultaneous Addition of 2% Aqueous Solutions of Two Flocculants, Starting at 68° F. and Holding at 68° F. | | | | | | |
|---|---|---|---|---|---|---|---|---|
| | | g. of Each Soln. Added | | % Lower Layer Separated After | | | | Absorbance at 560 nm |
| Run | First Flocculant | | Second Flocculant | 5 Minutes | 10 Minutes | 30 Minutes | 60 Minutes | |
| 1 | Primafloc C-3 | 1.00 | Purifloc A-23 | 0 | 0 | 0 | 5 | — |
| 2 | Primafloc C-3 | 0.100 | Purifloc A-23 | 0 | 0 | 0 | 2 | — |
| 3 | Primafloc C-3 | 1.00 | Primafloc A-10 | 0 | 0 | 0 | 1 | — |
| 4 | Primafloc C-3 | 0.100 | Primafloc A-10 | 0 | 0 | 0 | 1 | — |
| 5 | Primafloc C-7 | 1.00 | Purifloc A-23 | 0 | 1 | 2 | 5 | — |
| 6 | Primafloc C-7 | 0.100 | Purifloc A-23 | 0 | 0 | 0 | 1 | — |
| 7 | Primafloc C-7 | 1.00 | Primafloc A-10 | 0 | 0 | 2 | 5 | 1.92 |

TABLE 2.-continued

Simultaneous Addition of 2% Aqueous Solutions of Two Flocculants, Starting at 68° F. and Holding at 68° F.

| Run | First Flocculant | g. of Each Soln. Added | Second Flocculant | % Lower Layer Separated After 5 Minutes | 10 Minutes | 30 Minutes | 60 Minutes | Absorbance at 560 nm |
|---|---|---|---|---|---|---|---|---|
| 8 | Primafloc C-7 | 0.100 | Primafloc A-10 | 0 | 0 | 0 | 0 | — |

TABLE 3.

Addition of a 2% Aqueous Solution of a Cationic Flocculant Followed, After 5 Minutes, by the Addition of a 2% Aqueous Solution of an Anionic Flocculant, Starting at 68° F. and Holding at 68° F.

| Run | First Flocculant | g. of Each Soln. Added | Second Flocculant | % Lower Layer Separated After 5 Minutes | 10 Minutes | 30 Minutes | 60 Minutes | Absorbance at 560 nm |
|---|---|---|---|---|---|---|---|---|
| 1 | Primafloc C-3 | 1.00 | Purifloc A-23 | 0 | 0 | 7 | 15 | >3 |
| 2 | Primafloc C-3 | 0.100 | Purifloc A-23 | 0 | 0 | 0 | 1 | — |
| 3 | Primafloc C-3 | 1.00 | Primafloc A-10 | 0 | 0.5 | 1 | 35 | >3 |
| 4 | Primafloc C-3 | 0.100 | Primafloc A-10 | 0 | 0 | 1 | 3 | — |
| 5 | Primafloc C-7 | 1.00 | Purifloc A-23 | 0 | 1 | 1.5 | 65 | 1.08 |
| 6 | Primafloc C-7 | 0.100 | Purifloc A-23 | 0 | 0 | 1 | 1 | — |
| 7 | Primafloc C-7 | 1.00 | Primafloc A-10 | 0 | 0 | 1.5 | 55 | 1.66 |
| 8 | Primafloc C-7 | 0.100 | Primafloc A-10 | 0 | 0 | 1 | 5 | >3 |

TABLE 4.

Addition of 2% Aqueous Primafloc C-7 Followed by the Addition of a 2% Aqueous Solution of an Anionic Flocculant, Starting at 68° F. and Holding at 68° F.

| Run | g. of 2% Primafloc C-7 Added | Minutes Between Additions | Second Flocculant | g. of Soln. Added | % Lower Layer Separated After 5 Minutes | 10 Minutes | 30 Minutes | 60 Minutes | Absorbance at 560 nm |
|---|---|---|---|---|---|---|---|---|---|
| 1 | 1.00 | 2 | Purifloc A-23 | 0.50 | 5 | 5 | 15 | 18 | 1.61 |
| 2 | 1.00 | 2 | Purifloc A-23 | 2.00 | 5 | 5 | 5 | 14 | 1.31 |
| 3 | 0.50 | 2 | Purifloc A-23 | 1.00 | 3 | 4 | 5 | 6 | 1.53 |
| 4 | 2.00 | 2 | Purifloc A-23 | 1.00 | 1 | 10 | 22 | 42 | 0.90 |
| 5 | 1.00 | 2 | Primafloc A-10 | 0.50 | 3 | 3 | 14 | 27 | 1.08 |
| 6 | 1.00 | 2 | Primafloc A-10 | 2.00 | 4 | 5 | 21 | 27 | 1.37 |
| 7 | 0.50 | 2 | Primafloc A-10 | 1.00 | 4 | 5 | 5 | 8 | >2 |
| 8 | 2.00 | 2 | Primafloc A-10 | 1.00 | 5 | 8 | 27 | 52 | 0.67 |
| 9 | 1.00 | 5 | Purifloc A-23 | 0.50 | 0 | 1 | 7 | 12 | 1.58 |
| 10 | 1.00 | 5 | Purifloc A-23 | 2.00 | 0 | ½ | 1 | 9 | 1.48 |
| 11 | 0.50 | 5 | Purifloc A-23 | 1.00 | 0 | 0 | ½ | 1 | >2 |
| 12 | 2.00 | 5 | Purifloc A-23 | 1.00 | 2 | 2 | 30 | 50 | 0.86 |
| 13 | 1.00 | 5 | Primafloc A-10 | 0.50 | 1 | 1 | 8 | 15 | 1.72 |
| 14 | 1.00 | 5 | Primafloc A-10 | 2.00 | 0 | 1 | 15 | 19 | 1.37 |
| 15 | 0.50 | 5 | Primafloc A-10 | 1.00 | 0 | 0 | 1 | 2 | >2 |
| 16 | 2.00 | 5 | Primafloc A-10 | 1.00 | 1 | 1 | 26 | 48 | 0.58 |
| 17 | 1.00 | 10 | Purifloc A-23 | 0.50 | 3 | 4 | 13 | 14 | 1.21 |
| 18 | 1.00 | 10 | Purifloc A-23 | 2.00 | 0 | 0 | 2 | 4 | >2 |
| 19 | 0.50 | 10 | Purifloc A-23 | 1.00 | 2 | 4 | 5 | 5 | >2 |
| 20 | 2.00 | 10 | Purifloc A-23 | 1.00 | 3 | 5 | 37 | 57 | 0.81 |
| 21 | 1.00 | 10 | Primafloc A-10 | 0.50 | 2 | 3 | 4 | 17 | >2 |
| 22 | 1.00 | 10 | Primafloc A-10 | 2.00 | 0 | 0 | 4 | 14 | 1.38 |
| 23 | 0.50 | 10 | Primafloc A-10 | 1.00 | 0 | 0 | 1 | 1 | >2 |
| 24 | 2.00 | 10 | Primafloc A-10 | 1.00 | 0 | 1 | 30 | 47 | 0.65 |

TABLE 5.

Addition of 2% Aqueous Primafloc C-7 Followed, After 5 Minutes, by the Addition of a 2% Aqueous Solution of an Anionic Flocculant, Starting at 68° F. and Holding at 68° F.

| Run | g. of 2% Aqueous C-7 Added | Second Flocculant | g. of 2% Flocculant Added | % Lower Layer Separated After 5 Minutes | 10 Minutes | 30 Minutes | 60 Minutes | Absorbance at 560 nm |
|---|---|---|---|---|---|---|---|---|
| 1 | 4.0 | Primafloc A-10 | 1.0 | 1 | 25 | 60 | 67-black specks | 0.54 |
| 2 | 4.0 | Primafloc A-10 | 2.0 | 13 | 24 | 60 | 70-black specks | 0.89 |
| 3 | 4.0 | Purifloc A-23 | 1.0 | 3 | 24 | 51-black specks | 60-black specks | 0.45 |
| 4 | 4.0 | Purifloc A-23 | 2.0 | 10-black specks | 20-black specks | 50-black specks | 64-black specks | 0.52 |
| 5 | 4.0 | Purifloc A-23 | 0.5 | 2 | 18-black specks | 46-black specks | 60-black specks | 0.41 |
| 6 | 4.0 | Primafloc A-10 | 0.5 | 5 | 38-black specks | 66-black specks | 75-black specks | 0.88 |

TABLE 5.-continued

Addition of 2% Aqueous Primafloc C-7 Followed, After 5 Minutes, by the Addition of a 2% Aqueous Solution of an Anionic Flocculant, Starting at 68° F. and Holding at 68° F.

| Run | g. of 2% Aqueous C-7 Added | Second Flocculant | g. of 2% Flocculant Added | % Lower Layer Separated After | | | | Absorbance at 560 nm |
|---|---|---|---|---|---|---|---|---|
| | | | | 5 Minutes | 10 Minutes | 30 Minutes | 60 Minutes | |
| 7  | 2.0 | Purifloc A-23  | 0.5 | 1 | 1 | 10-black specks | 15-black specks | 0.90 |
| 8  | 2.0 | Primafloc A-10 | 0.5 | 0 | 0 | 15-black specks | 20-black specks | 1.31 |
| 9  | 1.0 | Purifloc A-23  | 1.0 | 0 | 1 | 1 | 1 | >2 |
| 10 | 1.0 | Primafloc A-10 | 1.0 | 0 | 1 | 5-black specks | 10-black specks | 1.85 |
| 11 | 2.0 | Purifloc A-23  | 1.0 | 0 | 1 | 16-black specks | 37-black specks | 0.55 |
| 12 | 2.0 | Primafloc A-10 | 1.0 | 0 | 0 | 15-black specks | 30-black specks | 1.28 |
| 13 | 2.0 | Primafloc A-10 | 2.0 | 1 | 10-black specks | 26-black specks | 47-black specks | 1.04 |
| 14 | 4.0 | None           | 0   | 1 | 45-black flocks | 75-black specks | 81-black specks | 0.88 |

TABLE 6.

Addition of 2% Aqueous Primafloc C-7 Followed, After 5 Minutes, by the Addition of a 2% Aqueous Solution of an Anionic Flocculant, Starting at an Elevated Temperature and Holding at the Same Temperature.

| Run | g. of 2% Aqueous Primafloc C-7 Added | Second Flocculant | g. of 2% Aqueous Second Flocculant Added | Temp. (°F.) | % Lower Layer Separated After | | | | Absorbance at 560 nm |
|---|---|---|---|---|---|---|---|---|---|
| | | | | | 5 Minutes | 10 Minutes | 30 Minutes | 60 Minutes | |
| 1  | 2.0  | Primafloc A-10 | 1.0 | 160 | 30-black flocks | 68-black specks | 75-black specks | 78-black specks | 0.44 |
| 2  | 2.0  | Purifloc A-23  | 1.0 | 160 | 62-black flocks | 72-black specks | 75-black specks | 75-black specks | 0.56 |
| 3  | 4.0  | None           | 0   | 160 | 37-black flocks | 45-black specks | 55-black specks | 63 | 0.33 |
| 4  | 1.0  | Primafloc A-10 | 1.0 | 160 | 0 | 0 | 0 | ½ | — |
| 5  | 1.0  | Purifloc A-23  | 1.0 | 160 | 0 | 0 | 1 | 0 | — |
| 6  | 3.0  | Primafloc A-10 | 1.0 | 160 | 55-black flocks | 62-black specks | 67-black specks | 82-black specks | 0.53 |
| 7  | 3.0  | Purifloc A-23  | 1.0 | 160 | 50-black specks | 63-black specks | 68-black specks | 69-black specks | 0.53 |
| 8  | 3.0  | None           | —   | 160 | 73-black specks | 83-black specks | 82-black specks | 86 | 0.37 |
| 9  | 2.0  | Primafloc A-10 | 1.0 | 190 | 0 | 0 | 12-black flocks | 42-black flocks | >2 |
| 10 | 2.0  | Purifloc A-23  | 1.0 | 190 | 0 | 0 | 15-black flocks | 50-black flocks | 1.58 |
| 11 | 2.0  | Purifloc A-23  | 0.5 | 160 | 24-black flocks | 60-black specks | 71-black specks | 75 | 0.49 |
| 12 | 2.0  | Primafloc A-10 | 0.5 | 160 | 55-black flocks | 66-black specks | 78 | 80 | 0.51 |
| 13 | 1.0  | Purifloc A-23  | 0.5 | 160 | 0 | 2 | 25-black specks | 60-black specks | 0.99 |
| 14 | 1.0  | Primafloc A-10 | 0.5 | 160 | 17-black flocks | 42-black flocks | 61-black specks | 75-black specks | 0.56 |
| 15 | 2.0  | None           | 0   | 160 | 45-black flocks | 65-black flocks | 70-black flocks | 73-black flocks | 0.31 |
| 16 | 1.0  | None           | 0   | 160 | 15-black flocks | 45-black flocks | 67-black flocks | 75-black flocks | 0.39 |
| 17 | None | None           | 0   | 160 | 0 | 0 | 0 | 0 | >2 |
| 18 | 0.5  | None           | 0   | 160 | 0 | 15-black flocks | 55-black flocks | 66-black specks | 0.80 |
| 19 | None | Purifloc A-23  | 2.0 | 160 | 0 | 0 | 0 | 0 | >2 |
| 20 | None | Purifloc A-23  | 1.0 | 160 | 0 | 0 | 0 | 0 | >2 |
| 21 | None | Primafloc A-10 | 2.0 | 160 | 0 | 0 | 0 | 0 | >2 |
| 22 | None | Primafloc A-10 | 1.0 | 160 | 0 | 0 | 0 | 0 | >2 |
| 23 | 0.25 | None           | 0   | 160 | 0 | 0 | 12-black specks | 35-black flocks | >2 |

TABLE 7.

Addition of 2% Aqueous Primafloc C-7, Starting at an Elevated Temperature, Pouring Into a Separatory Funnel, Immediately Plunging Into a 68° F. Water Bath for 5 Minutes and Holding in Air at 68° F.

| Run | g. of 2% Aqueous Primafloc C-7 Added | Initial Temp. (°F.) | % Lower Layer Separated After | | | | Absorbance at 560 nm |
|---|---|---|---|---|---|---|---|
| | | | 5 Minutes | 10 Minutes | 30 Minutes | 60 Minutes | |
| 1 | 2.0 | 160 | 5               | 15-black flocks | 43-black flocks | 55-black flocks | 0.44 |
| 2 | 2.0 | 190 | 10-black flocks | 47-black flocks | 60-black specks | 65-black specks | 0.41 |
| 3 | 1.0 | 160 | 0               | 1-black flock   | 15-black flocks | 30-black flocks | 1.06 |
| 4 | 1.0 | 190 | 0               | 1-black flock   | 30-black flocks | 55-black flocks | 1.42 |

TABLE 8.

Addition of 2% Aqueous Primafloc C-7, Starting at 140° F. and Holding at 105° F. in a Water Bath.

| Run | First Flocculant | g. of 2% Aqueous First Flocculant | Second Flocculant | g. of 2% Aqueous Second Flocculant | % Lower Layer Separated After | | | | Absorbance at 560 nm |
|---|---|---|---|---|---|---|---|---|---|
| | | | | | 5 Min. | 10 Min. | 30 Min. | 60 Min. | |
| 1 | Primafloc C-7 | 2.0 | Primafloc A-10[a] | 1.0 | 10-flocks | 22-flocks | 55-specks | 65-specks | 0.88 |
| 2 | Primafloc C-7 | 1.5 | None              | 0   | 5-flocks  | 10-specks | 30-specks | 45-specks | 1.68 |

TABLE 8.-continued

Addition of 2% Aqueous Primafloc C-7, Starting at 140° F.
and Holding at 105° F. in a Water Bath.

| Run | First Flocculant | g. of 2% Aqueous First Flocculant | Second Flocculant | g. of 2% Aqueous Second Flocculant | % Lower Layer Separated After | | | | Absorbance at 560 nm |
|---|---|---|---|---|---|---|---|---|---|
| | | | | | 5 Min. | 10 Min. | 30 Min. | 60 Min. | |
| 3 | Primafloc C-7 | 2.0 | None | 0 | 5-specks | 21-flocks | 59-specks | 66-specks | 0.45 |
| 4 | Primafloc C-7 | 3.0 | None | 0 | 30-flocks | 55-specks | 73-specks | 76-specks | 0.45 |
| 5 | Primafloc C-7 | 4.0 | None | 0 | 15-flocks | 70-flocks | 78-flocks | 80-specks | 1.05 |

(a)2% aqueous solution of Primafloc A-10 added 5 minutes after the initial addition of Primafloc C-7.

TABLE 9.

Addition of Single Flocculants, Starting at 140° F. and Holding at 105° F. in a Water Bath

| Run | Flocculant | Amount Flocculant Added | % Lower Layer Separated After | | | | Absorbance at 560 nm |
|---|---|---|---|---|---|---|---|
| | | | 5 Minutes | 10 Minutes | 30 Minutes | 60 Minutes | |
| 1 | Calgon WT-2820 (6% Active) | 0.67 g. | 48-flocks | 65-flocks | 75-flocks | 78-specks | 0.38 |
| 2 | Dow Purifloc C-41 | 2 g. 2% Aq. Soln. | 0 | 0 | 0 | 0 | >2 |
| 3 | Dearborn X-1807 | 2 g. 2% Aq. Soln. | 0 | 0 | 0 | 0 | >2 |
| 4 | Dearborn 4891 | 2 g. 2% Aq. Soln. | 0 | 0 | 0 | 0 | >2 |
| 5 | Dearborn Aquafloc 431 | 2 g. 2% Aq. Soln. | 0 | 0 | 0 | 0 | >2 |
| 6 | Dearborn Aquafloc 420 | 2 g. 2% Aq. Soln. | 0 | 0 | 0 | 0 | >2 |
| 7 | Dearborn Aquafloc 417 | 2 g. 2% Aq. Soln. | 0 | 0 | 0 | 0 | >2 |
| 8 | Hercofloc 871 (11½–13½% Active) | 0.13 g. | 10-flocks | 25-flocks | 55-specks | 65-specks | 1.02 |
| 9 | Hercofloc 848 (38–42% Active) | 2 g. 2% Aq. Soln. | 5-flocks | 17-flocks | 37-flocks | 52-specks | 1.75 |
| 10 | Betz 1130 | 2 g. 2% Aq. Soln. | 0 | 5-flocks | 15-flocks | 60-flocks | 2.51 |

TABLE 10.

Large Scale Clarification of Black 10-34-0 Grade Ammonium Polyphosphate Solutions.

| Run | % C-7 in 10-34-0 | % A-10 in 10-34-0 | Time After Last Addition | % Clear Lower Phase | Lower Phase Absorbance at 560 nm |
|---|---|---|---|---|---|
| 1 A | 0.027 | 0 | 60 Min. | 72-specks | 0.60 |
| 1 B | 0.027 | 0.013 | 60 Min. | 81-specks | 0.28 |
| | | | 6 Days | 95 | 0.17 |
| 2 A | 0.020 | 0.0057 | 60 Min. | 67-specks | 0.35 |
| | | | 1 Day | 83 | 0.26 |
| | | | 3 Days | 91 | 0.12 |
| 2 B | 0.020 | 0 | 60 Min. | 64-specks | 0.98 |
| 3 | 0.026 | 0 | 60 Min. | 61-specks | 0.50 |
| | | | 12 Days | 91 | |

I claim:

1. A process for the removal of suspended carbonaceous material from an aqueous ammonium polyphosphate solution wherein (i) said solution contains from about 10 to about 90% by weight of the total $P_2O_5$ in a polyphosphate form, (ii) said solution has a pH above about 4.5, (iii) said solution is prepared by the molecular dehydration and subsequent or concurrent ammoniation of wet-process phosphoric acid, (iv) said solution ranges in grade from about 8-27-0 to about 13-37-0, and (v) said carbonaceous material results from organic impurities in said wet-process phosphoric acid which char during said molecular dehydration, which process comprises the steps of:

(a) mixing said ammonium polyphosphate solution with an aqueous solution of a polyvinyl imidazoline bisulfate having a high charge density and a molecular weight in excess of one million, wherein the amount of said polyvinyl imidazoline bisulfate is from about 0.001 to about 0.5% by weight based on the weight of said ammonium polyphosphate solution, and wherein said aqueous polyvinyl imidazoline bisulfate solution contains from about 0.1 to about 5% by weight of said polyvinyl imidazoline bisulfate;

(b) holding the resulting mixture for a period of time effective to permit the separation of said mixture into an upper layer of flocculated carbonaceous material and a lower layer of clarified ammonium polyphosphate solution; and (c) separating said lower layer of clarified ammonium polyphosphate solution from said upper layer of flocculated carbonaceous material.

2. The process as set forth in claim 1 wherein an aqueous solution of at least one anionic polymer having a high charge density and a molecular weight in excess of one million is additionally added to said mixture of ammonium polyphosphate solution and aqueous polyvinyl imidazoline bisulfate solution, wherein said anionic polymer is a copolymer of methacrylic acid and an acrylic ester which has been neutralized with base, wherein the amount of said anionic polymer is from about 0.001 to about 0.1% by weight based on the weight of said ammonium polyphosphate solution, wherein said aqueous anionic polymer solution contains from about 0.1 to about 5% by weight of said anionic polymer, and wherein said anionic polymer is added to the ammonium polyphosphate solution subsequent to the addition of said polyvinyl imidazoline bisulfate.

* * * * *